(12) United States Patent
Sueoka et al.

(10) Patent No.: US 11,587,580 B2
(45) Date of Patent: Feb. 21, 2023

(54) MAGNETIC STORAGE APPARATUS

(71) Applicant: SHOWA DENKO K.K., Tokyo (JP)

(72) Inventors: Yoshihito Sueoka, Chiba (JP); Koji Itokazu, Chiba (JP); Noriya Seiki, Chiba (JP); Michitaka Takasaki, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/658,475

(22) Filed: Apr. 8, 2022

(65) Prior Publication Data
US 2022/0343942 A1    Oct. 27, 2022

(30) Foreign Application Priority Data

Apr. 21, 2021   (JP) .............................. JP2021-071860

(51) Int. Cl.
*G11B 11/105*   (2006.01)
*G11B 5/012*    (2006.01)
*G11B 5/127*    (2006.01)

(52) U.S. Cl.
CPC .............. *G11B 5/012* (2013.01); *G11B 5/127* (2013.01)

(58) Field of Classification Search
CPC .... G11B 5/00; G11B 5/09; G11B 5/02; G11B 20/10222; G11B 2005/0018; G11B 2005/0021; G11B 5/012; G11B 20/10009; G11B 5/54; G11B 11/10533; G11B 11/10588; G11B 11/10508; G11B 7/00456
USPC ...................................................... 360/75, 59
See application file for complete search history.

(56) References Cited

FOREIGN PATENT DOCUMENTS

| CN | 103489456 A | * | 1/2014 | ............. G11B 5/455 360/59 |
| WO | 00/057404 |  | 9/2000 |  |

\* cited by examiner

*Primary Examiner* — Nabil Z Hindi
(74) *Attorney, Agent, or Firm* — Ipusa, PLLC

(57) ABSTRACT

A magnetic storage apparatus includes a disk-shaped magnetic recording medium, a motor which drives and rotates the magnetic recording medium, a magnetic head, including a first magnetic head element which reads information from the magnetic recording medium, and a second magnetic head element which writes information to the magnetic recording medium, and a bias circuit which supplies a predetermined bias voltage to the first magnetic head element. The magnetic recording medium has a laminated structure including a magnetic layer disposed above a substrate, and a carbon protective layer disposed above the magnetic layer. The bias circuit supplies to the first magnetic head element a voltage which is in a range of −0.2 V to −1.0 V with respect to a potential of the magnetic recording medium.

3 Claims, 2 Drawing Sheets

MAGNETIC STORAGE APPARATUS

CROSS-REFERENCE TO RELATED APPLICATIONS

This application is based upon and claims priority to Japanese Patent Application No. 2021-071860 filed on Apr. 21, 2021, the entire contents of which are incorporated herein by reference.

BACKGROUND OF THE INVENTION

1. Field of the Invention

The present disclosure relates to magnetic storage apparatuses.

2. Description of the Related Art

A magnetic storage apparatus is popularly used for recording and storing various kinds of data on various kinds of recording media, including hard disks or the like, for example. The magnetic storage apparatus is also referred to as a magnetic recording and reproducing apparatus. The magnetic storage apparatus includes a magnetic head that is used for writing information to and reading information from the magnetic recording medium. The magnetic head includes a write head (or recording head), and a read head (or reproducing head). The magnetic head writes the information to and reads the information from the magnetic recording medium, while moving in a state floating above a surface of the magnetic recording medium.

The write head includes an electromagnet which is a combination of a coil and a magnetic body. In order to cope with access areas which have become extremely small in recent years, a thin film head may be used for the write head. The thin film head includes the coil which is etched and formed on a surface of the magnetic body.

A magneto resistive (MR) head having a high sensitivity by utilizing the magneto resistance effect, a giant magneto resistive (GMR) head which utilizes the giant magneto resistive effect, a tunneling magneto resistive (TMR) head which utilizes the tunneling magneto resistance effect, or the like may be used for the read head. The TMR head has a basic configuration including a TMR element sandwiched between two electrodes, and magnetically reads the information according to a current variation between the two electrodes.

A voltage of approximately 0.2 V is typically applied between the two electrodes which are exposed to oppose the surface of the magnetic recording medium. For this reason, in order to prevent a discharge between the magnetic recording medium and the electrodes, a magnetic disk memory apparatus proposed in International Publication WO00/057404A1, for example, electrically connects one end of the electrode to the magnetic recording medium, so that potentials of the electrode and the magnetic recording medium become approximately the same.

A floating amount of the magnetic head from the surface of the magnetic recording medium has become extremely small, due to the improved recording density of the magnetic recording medium. When the floating amount of the magnetic head is small, even a small amount of contaminants on the magnetic recording medium may cause problems. The contaminants may include environmental chemical substances or the like, for example. The contaminants may adhere to or be transferred onto the magnetic head, upon contact between the magnetic head and the magnetic recording medium, or when the floating amount of the magnetic head is extremely small. Such contamination of the magnetic head by the contaminants not only deteriorates the write and read characteristics (or recording and reproducing characteristics) of the magnetic head, but also deteriorates the floating stability of the magnetic head, thereby causing damage to the magnetic head.

SUMMARY OF THE INVENTION

One object according to one aspect of embodiments of the present disclosure is to provide a magnetic storage apparatus capable of reducing transfer of contaminants to a magnetic head.

One aspect of the embodiments of the present disclosure provides a magnetic storage apparatus including a disk-shaped magnetic recording medium; a motor configured to drive and rotate the magnetic recording medium; a magnetic head, including a first magnetic head element configured to read information from the magnetic recording medium, and a second magnetic head element configured to write information to the magnetic recording medium; and a bias circuit configured to supply a predetermined bias voltage to the first magnetic head element, wherein the magnetic recording medium has a laminated structure including a magnetic layer disposed above a substrate, and a carbon protective layer disposed above the magnetic layer, and wherein the bias circuit supplies to the first magnetic head element a voltage which is in a range of $-0.2$ V to $-1.0$ V with respect to a potential of the magnetic recording medium.

Other objects and further features of the present disclosure will be apparent from the following detailed description when read in conjunction with the accompanying drawings.

DESCRIPTION OF THE PREFERRED EMBODIMENTS

Figure 1:
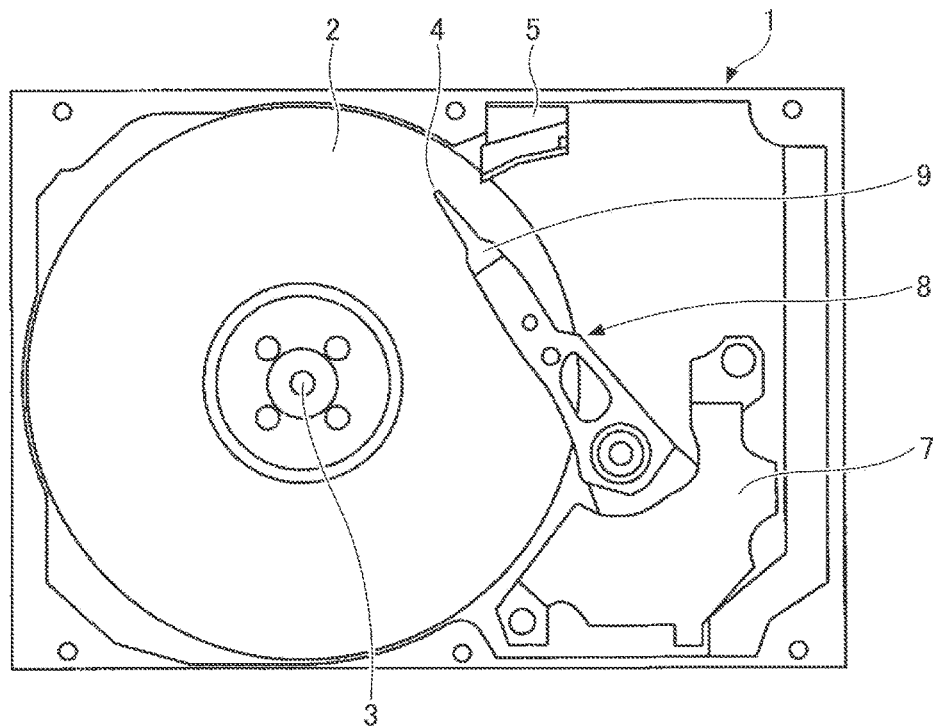
FIG. 1 is a schematic diagram illustrating a configuration of a magnetic storage apparatus according to one embodiment of the present disclosure.

Hereinafter, embodiments of the present disclosure will be described in detail. In order to facilitate understanding of the description, the same constituent elements in the drawings are designated by the same reference numerals, and a repeated description of the same constituent elements may be omitted. In addition, the constituent elements in the drawings may be not be drawn to actual scale, and the scale may differ among the figures. A "range from A to B" refers to a range including a lower limit value A and an upper limit value B of the range, unless otherwise indicated.

<Magnetic Storage Apparatus>

A magnetic storage apparatus according to one embodiment of the present disclosure includes a disk-shaped magnetic recording medium, a motor configured to drive and rotate the magnetic recording medium, a magnetic head, including a first magnetic head element configured to read information from the magnetic recording medium, and a second magnetic head element configured to write information to the magnetic recording medium, and a bias circuit configured to supply a predetermined bias voltage to the first magnetic head element. The magnetic recording medium has a laminated structure including a magnetic layer disposed above a substrate, and a carbon protective layer disposed above the magnetic layer. The bias circuit supplies to the first magnetic head element a voltage which is in a range of −0.2 V to −1.0 V with respect to a potential of the magnetic recording medium. Because the magnetic storage apparatus according to the present embodiment has the configuration described above, it is possible to reduce contamination and damage of the magnetic head caused by contamination of the magnetic recording medium.

It was conventionally considered that the contaminants present on the surface of the magnetic recording medium often originate from the outside during a manufacturing process of the magnetic recording medium. It was regarded that the contaminants originating from the outside are caused by the ambient environment, handling of the magnetic recording medium, or the like. For this reason, attempts were made to make the manufacturing environment of the magnetic recording medium cleaner, so as to reduce the contaminants present on the surface of the magnetic recording medium.

On the other hand, the recording density required of the magnetic storage apparatuses is still increasing, and the floating amount of the magnetic head floating from the surface of the magnetic recording medium is becoming even smaller. As a result, micro contaminants, which are extremely small contaminants that cannot be removed by conventional methods, are beginning to cause a problem.

The present inventors analyzed the cause of the micro contaminants that are generated and adhere to the magnetic head. The present inventors found that a considerably large proportion of the micro contaminants are products of carbon and carbon nitride generated from a carbon protective layer of the magnetic recording medium, and that these products adhere to the magnetic head due to a potential present between the magnetic recording medium and the magnetic head. The present inventors also found that these deposits on the magnetic head have a negative charge, and easily adhere to the magnetic head due to the potential present between the magnetic recording medium and the magnetic head. The present inventors conceived that, by providing a bias circuit which supplies a predetermined bias voltage to a magnetic head element for reading information, and supplying a voltage which is in a range of −0.2 V to −1.0 V with respect to a potential of the magnetic recording medium, it is possible to reduce the adhesion of the products generated from the carbon protective layer of the magnetic recording medium to the magnetic head.

FIG. 1 is a schematic diagram illustrating a configuration of a magnetic storage apparatus according to one embodiment of the present disclosure. As illustrated in FIG. 1, a magnetic storage apparatus 1 according to the present embodiment includes a disk-shaped magnetic recording medium 2, a motor 3 for driving and rotating the magnetic recording medium 2, a magnetic head 4 for reading information from and writing information to the magnetic recording medium 2, and a ramp mechanism 5 for causing the magnetic head 4 to recede from a position above the magnetic recording medium 2.

FIG. 1 illustrates a state where the magnetic head 4 is used to read information from or write information to the magnetic recording medium 2. The magnetic head 4 floats in a vertical direction from a principal surface of the magnetic recording medium 2 due to an air vortex caused by rotation of the magnetic recording medium 2 which is driven and rotated by the motor 3. In addition, the magnetic head 4 is driven by a voice coil motor 7 to move in a direction parallel to the principal surface of the magnetic recording medium 2.

Of course, the number of magnetic heads 4 and the number of magnetic recording media 2 provided in the magnetic storage apparatus 1 are not particularly limited.

Figure 2:
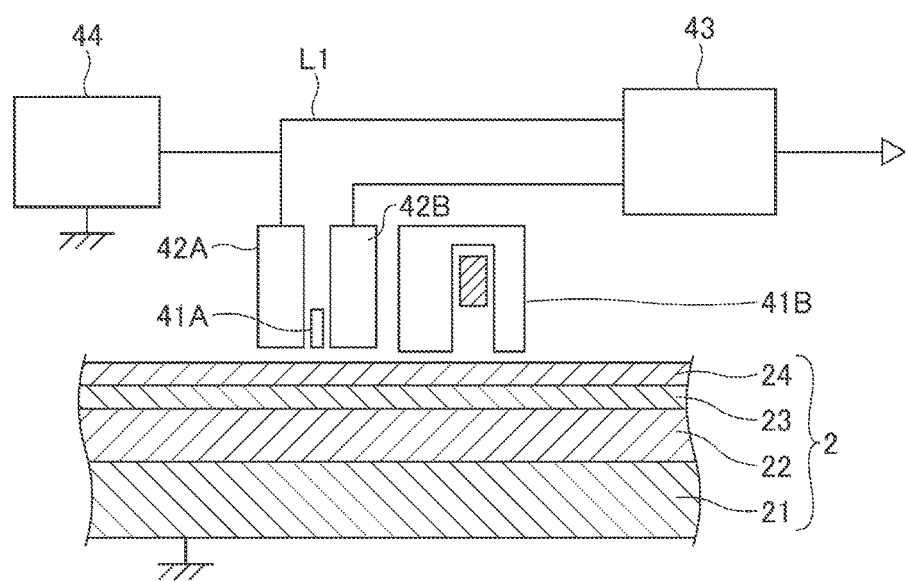
FIG. 2 is a diagram schematically illustrating a magnetic recording medium and a magnetic head.

FIG. 2 is a diagram schematically illustrating the magnetic recording medium 2 and the magnetic head 4. As illustrated in FIG. 2, the magnetic recording medium 2 includes a magnetic layer 22, a carbon protective layer 23, and a lubricant layer 24 that are successively laminated in this order on a non-magnetic substrate 21. Further, the magnetic recording medium 2 is grounded.

The magnetic head 4 is provided on a tip end of a gimbal 9 of a head assembly 8. The magnetic head 4 includes a magnetic head element 41A for reading information from the magnetic recording medium 2, a magnetic head element 41B for writing information to the magnetic recording medium 2, and a pair of electrodes 42A and 42B. The magnetic head element 41A is an example of a first magnetic head element, and may also be referred to as a read head element or a reproducing head element. The magnetic head element 41B is an example of a second magnetic head element, and may also be referred to as a write head element or a recording head element. The pair of electrodes 42A and 42B is connected to a preamplifier 43, and an output signal of the magnetic head element 41A which reads the information is supplied to the preamplifier 43 via the pair of electrodes 42A and 42B. In addition, a bias circuit 44 is connected to an interconnect L1 connecting the electrode 42A and the preamplifier 43. The bias circuit 44 applies a voltage, which is in a range of −0.2 V to −1.0 V with respect to a ground potential of the magnetic recording medium 2, across the pair of electrodes 42A and 42B.

Because a resistance value of the magnetic head element 41A which reads the information is typically approximately 20Ω, and a bias current applied to the magnetic head element 41A is approximately 10 mA, a potential difference of approximately 0.2 V is generated between the pair of electrodes 42A and 42B of the magnetic head element 41A.

Generally, in the magnetic storage apparatus, one end of the electrode of the magnetic head element is connected to the magnetic recording medium in order to prevent a discharge between the magnetic head element and the magnetic recording medium. For this reason, a potential difference having an absolute value in a range of 0 V to 0.2 V is generated between each of the magnetic head elements 41A and 41B and the magnetic recording medium 2, and a potential difference having an absolute value a range of 0 V to 0.2 V is generated between the pair of electrodes 42A and 42B of the magnetic head element 41A.

On the other hand, according to studies conducted by the present inventors, even if the potential difference in the range of 0 V to 0.2 V generated between each of the magnetic head elements 41A and 41B and the magnetic recording medium 2 is a negative value, the present inventors noted that there is a high possibility the adhesion of the contaminants of carbon and carbon nitride having the negative charge, generated from the carbon protective layer 23, to the magnetic head 4 cannot be sufficiently reduced. In order to prevent the contamination of the magnetic head 4, the present inventors found that it is necessary to apply a negative potential having an absolute value of 0.2 V or higher, and preferably 0.3 V or higher, to the magnetic head elements 41A and 41B, with respect to the potential of the magnetic recording medium 2. The higher the negative potential between each of the magnetic head elements 41A and 41B and the magnetic recording medium 2 becomes, the less ionic material having the negative charge of the carbon and carbon nitride generated from the carbon protective layer 23 adheres to the magnetic head 4. However, if the negative potential between each of the magnetic head elements 41A and 41B and the magnetic recording medium 2 becomes excessively high, another ionic material having a positive charge may adhere to the magnetic head 4, to thereby increase the possibility of a discharge from occurring between each of the magnetic head elements 41A and 41B and the magnetic recording medium 2. Hence, the negative potential between each of the magnetic head elements 41A and 41B and the magnetic recording medium 2 is set to an absolute value of 1.0 V or lower, and preferably 0.7 V or lower.

Accordingly, the magnetic head element 41A for reading information has a configuration in which two ends thereof are sandwiched between the pair of electrodes 42A and 42B. The magnetic head elements 41A and 41B and the electrodes 42A and 42B, as a whole, are set to a potential in a range of −0.2 V to −1.0 V, and preferably in a range of −0.3 V to −0.7 V, with respect to the ground potential of the magnetic recording medium 2.

The magnetic recording medium 2 may include other layers, in addition to the non-magnetic substrate 21, the magnetic layer 22, the carbon protective layer 23, and the lubricant layer 24. For example, the magnetic recording medium 2 may be include an adhesive layer, a soft magnetic underlayer, a seed layer, an orientation control layer, or the like between the non-magnetic substrate 21 and the magnetic layer 22, as necessary and/or appropriate. The soft magnetic underlayer may include a first soft magnetic layer, an intermediate layer, and a second soft magnetic layer, for example. The orientation control layer may have a single-layer structure, a two-layer structure including two layers, or the like, for example. The orientation control layer having the two-layer structure may include a first orientation control layer, and a second orientation control layer, for example. Materials forming the adhesive layer, the soft magnetic underlayer, the seed layer, the orientation control layer, or the like may be similar to the materials generally used in the magnetic recording medium for such layers.

An example of a method for manufacturing the magnetic recording medium 2 will be described. The method for manufacturing the magnetic recording medium 2 at least includes the steps of forming the magnetic layer 22 on the non-magnetic substrate 21, forming the carbon protective layer 23 on the magnetic layer 22, and forming the lubricant layer 24 on the carbon protective layer 23.

The non-magnetic substrate 21 may include a base made of a metallic material, such as Al, Al alloy, or the like, and a film made of NiP or NiP alloy formed on the base. The non-magnetic substrate 21 may include a base made of a non-metallic material, such as glass, ceramics, silicon, silicon carbide, carbon, resin, or the like, and a film made of NiP or NiP alloy famed on the base made of the non-metallic material.

The magnetic layer 22 may be formed by a layer made of Co—Cr-based alloys, Co—Cr—Ta-based alloys, Co—Cr—Pt-based alloys, Co—Cr—Pt—Ta-based alloys, Co—Cr—Pt—B—Ta-based alloys, or the like. The magnetic layer 22 may be formed by any method known in the art.

A thickness of the magnetic layer 22 is preferably in a range of 5 nm to 100 nm, more preferably in a range of 6 nm to 50 nm, and furthermore preferably in a range of 7 nm to 22 nm. If the thickness of the magnetic layer 22 falls within the preferable range described above, a high recording density can be achieved.

In this specification, the thickness of the magnetic layer 22 refers to a length of the magnetic layer 22 in a direction perpendicular to a principal surface of the magnetic layer 22. The thickness of the magnetic layer 22 is measured at an arbitrary position in a cross section of the magnetic layer 22. When the measurement is made at several arbitrary positions in the cross section of the magnetic layer 22, an average value of the measured thicknesses may be regarded as the thickness of the magnetic layer 22. Hereinafter, measurement methods similar to that used to measure the thickness of the magnetic layer 22 may be used to measure the thickness of other layers.

The magnetic layer 22 may be formed on the non-magnetic substrate 21 by a sputtering method or the like.

The magnetic layer 22 may include a plurality of layers that are laminated. In this case, a non-magnetic layer may be included between two mutually adjacent layers of the magnetic layer 22. A material forming the non-magnetic layer may be similar to the material generally used in the magnetic recording medium for such a non-magnetic layer. Each of the layers of the magnetic layer 22 may be made of the same kind of material, or may be made of different kinds of materials.

The carbon protective layer 23 has a function to protect the magnetic layer 22, and to increase or improve slidability of the magnetic head 4. The carbon protective layer 23 may be made of a known material, such as carbon, carbon nitride, hydrogenated carbon, hydrogenated carbon nitride, or the like.

A thickness of the carbon protective layer 23 is preferably in a range of 1 nm to 10 nm, from a viewpoint of reducing a magnetic spacing or from a viewpoint of durability, when used in a high recording density state. The magnetic spacing represents a distance between each of the magnetic head elements 41A and 41B of the magnetic head 4 and the magnetic layer 22. The narrower the magnetic spacing becomes, the more the electromagnetic conversion characteristics improve.

The carbon protective layer 23 is typically formed by a sputtering method using a carbon target material, a chemical vapor deposition (CVD) method using a hydrocarbon source material such as ethylene, toluene, or the like, or an ion beam deposition (IBD) method. The carbon protective layer 23 may be formed by arbitrarily combining such methods.

A thickness of the lubricant layer 24 is preferably in a range of 1 nm to 3 nm.

The lubricant layer 24 may be formed using a liquid lubricant layer. Preferably, the liquid lubricant layer is chemically stable, has a low friction, and a low sticking or adhering property. A fluororesin-based lubricant, such as a perfluoropolyether-based lubricant or the like including a compound having a perfluoropolyether structure, is preferably used for the lubricant layer 24.

The lubricant layer 24 may be formed on the carbon protective layer 23 by a coating method or the like.

As described above, the magnetic storage apparatus 1 includes the magnetic recording medium 2 having the magnetic layer 22 and the carbon protective layer 23 successively laminated on the non-magnetic substrate 21 in this order, the motor 3, the magnetic head 4 having the magnetic head elements 41A and 41B, and the bias circuit 44. The bias circuit 44 supplies a voltage in a range of −0.2 V to −1.0 V to the magnetic head elements 41A and 41B, with respect to the potential of the magnetic recording medium 2. The magnetic storage apparatus 1 can reduce the adhesion of the ionic material having the negative charge of the carbon and carbon nitride generated from the carbon protective layer 23, to the magnetic head elements 41A and 41B, and reduce the adhesion of another ionic material having the positive charge to the magnetic head elements 41A and 41B. For this reason, the magnetic storage apparatus 1 can reduce the transfer of the contaminants, such as the ionic materials or the like, to the magnetic head 4. Accordingly, the magnetic storage apparatus 1 can have stable magnetic recording and reproducing characteristics, because the information can be reliably read from and written to the magnetic recording medium 2. Further, the magnetic storage apparatus 1 can prevent contamination and damage of the magnetic head 4 caused by contamination of the magnetic recording medium 2, and exhibit an excellent environmental resistance.

The magnetic storage apparatus 1 can set the voltage supplied to the magnetic head elements 41A and 41B in the range of −0.3 V to −0.7 V. Accordingly, because the magnetic storage apparatus 1 can reduce the adhesion of the ionic material having the negative charge of the carbon and carbon nitride generated from the carbon protective layer 23, to the magnetic head elements 41A and 41B, and reduce the adhesion of another ionic material having the positive charge to the magnetic head elements 41A and 41B, the magnetic storage apparatus 1 can more positively reduce the transfer of the contaminants, such as the ionic materials or the like, to the magnetic head 4.

Because the magnetic storage apparatus 1 has the characteristics described above, the magnetic spacing between the magnetic head and the magnetic recording medium becomes narrow, and even when the floating amount (sometimes also referred to as the flying height) of the magnetic head is further reduced, it is possible to reduce the transfer of the contaminants to the magnetic head 4 while the magnetic storage apparatus 1 is in use. Hence, the magnetic storage apparatus 1 can be suitably applied to a magnetic storage apparatus having a high recording density.

Exemplary Implementation

Hereinafter, although exemplary implementations and comparative examples are illustrated and described further in detail, the embodiments are not limited by these exemplary implementations implementations and comparative examples.

<Manufacturing Magnetic Recording Medium>

A cleaned glass substrate (manufactured by HOYA Corporation, having an outer diameter of 2.5 inches) was accommodated in a deposition chamber of a DC magnetron sputtering apparatus (C-3040 manufactured by Canon Anelva Corporation), and the deposition chamber was evacuated to a vacuum of $1 \times 10^{-3}$ Pa.

Thereafter, an adhesive layer having a thickness of 10 nm was deposited on the glass substrate by a sputtering method using a Cr target.

Next, a soft magnetic underlayer was deposited on the adhesive layer by a sputtering method. The soft magnetic underlayer was formed by depositing a first soft magnetic layer, an intermediate layer, and a second soft magnetic layer. First, the first soft magnetic layer having a thickness of 25 nm was deposited at a substrate temperature of 100° C. or lower using a Co-20Fe-5Zr-5Ta {Fe-content: 20 at. %, Zr-content: 5 at. %, Ta-content: 5 at. %, and remainder Co} target, where "at. %" represents atomic percent. Next, the intermediate layer made of Ru and having a thickness of 0.7 nm was deposited on the first soft magnetic layer. Thereafter, the second soft magnetic layer made of Co-20Fe-5Zr-5Ta having a thickness of 25 nm was deposited on the intermediate layer.

Next, the seed layer having a thickness of 5 nm was deposited on the soft magnetic underlayer by a sputtering method using a Ni-6W {W-content: 6 at. %, and remainder Ni} target.

Thereafter, a Ru layer having a thickness of 10 nm was deposited on the seed layer by a sputtering method using a sputtering pressure of 0.8 Pa, as the first orientation control layer. Next, a Ru layer having a thickness of 10 nm was deposited on the first orientation control layer by a sputtering method using a sputtering pressure of 1.5 Pa, as the second orientation control layer.

Next, the first magnetic layer made of 91(Co15Cr16Pt)-6(SiO$_2$)-3(TiO$_2$) {91 mol % of an alloy including Cr-content: 15 at. %, Pt-content: 16 at. %, remainder Co, 6 mol % of SiO$_2$, and 3 mol % of TiO$_2$} and having a thickness of 9 nm was deposited on the second orientation control layer by a sputtering method using a sputtering pressure of 2 Pa, where "mol %" represents mole percent.

Next, the non-magnetic layer made of 88(Co30Cr)-12(TiO$_2$) {88 mol % of an alloy including Cr-content: 30 at. %, remainder Co, and 12 mol % of TiO$_2$} and having a thickness of 0.3 nm was deposited on the first magnetic layer by a sputtering method.

Thereafter, the second magnetic layer made of 92(Co11Cr18Pt)-5(SiO$_2$)-3(TiO$_2$) {92 mol % of an alloy including Cr-content: 11 at. %, Pt-content: 18 at. %, remainder Co, 5 mol % of SiO$_2$, and 3 mol % of TiO$_2$} and having a thickness of 6 nm was deposited on the non-magnetic layer by a sputtering method using a sputtering pressure of 2 Pa.

Next, the non-magnetic layer made of Ru and having a thickness of 0.3 nm was deposited on the second magnetic layer by a sputtering method.

Next, the third magnetic layer having a thickness of 7 nm was deposited on the non-magnetic layer by a sputtering method using a Co-20Cr-14Pt-3B {Cr-content: 20 at. %, Pt-content: 14 at. %, B-content: 3 at. %, remainder Co} target, at a sputtering pressure of 0.6 Pa.

Next, the protective layer made of carbon nitride (Ni-content: 5 at. %) and having a thickness of 3 nm was deposited on the third magnetic layer by an ion beam method.

Next, the lubricant layer having a thickness of 1.4 nm was formed by coating a perfluoropolyether-based liquid lubricant on the protective layer by a dip-coating method, to thereby complete manufacturing of the magnetic recording medium.

<Seek Evaluation of Magnetic Recording Medium>

The magnetic storage apparatus having the configuration illustrated in FIG. 1 was manufactured using the magnetic recording medium manufactured as described above, to perform a seek evaluation. The inside of the magnetic storage apparatus was filled with helium. A filling pressure of the helium was 532 Torr. The magnetic storage apparatus was set in an environment having a temperature of 60° C., and the magnetic head was moved to a position (radial position) having a radius of 32 mm above the magnetic recording medium, in a state where the magnetic recording medium is rotated at 7200 rpm. A potential difference between the high-potential side in absolute value of the magnetic head element and the magnetic recording medium was varied to +1.0 V, +0.8 V, +0.6 V, +0.4 V, 0 V, −0.3 V, −0.7 V, and −1.0 V. Under each varied condition (that is, potential difference), the magnetic head was caused to float at a fixed point above the magnetic recording medium for 900 seconds, to evaluate an amount of contaminants adhered to the magnetic head. The evaluated amount of contaminants was derived by measuring a Δ touchdown power of the magnetic head.

Power is applied to a built-in heater of the magnetic head, provided near the magnetic head element for reading, so that the magnetic head element for reading is brought close to the surface of the magnetic recording medium by utilizing the thermal expansion of the heater. The Δ touchdown power refers to the power that is applied to the heater when the magnetic head element for reading finally makes contact with, that is, touches down on, the surface of the magnetic recording medium. The greater the amount of contaminants adhered to the magnetic head, the greater the absolute value of the Δ touchdown power becomes.

Figure 3:
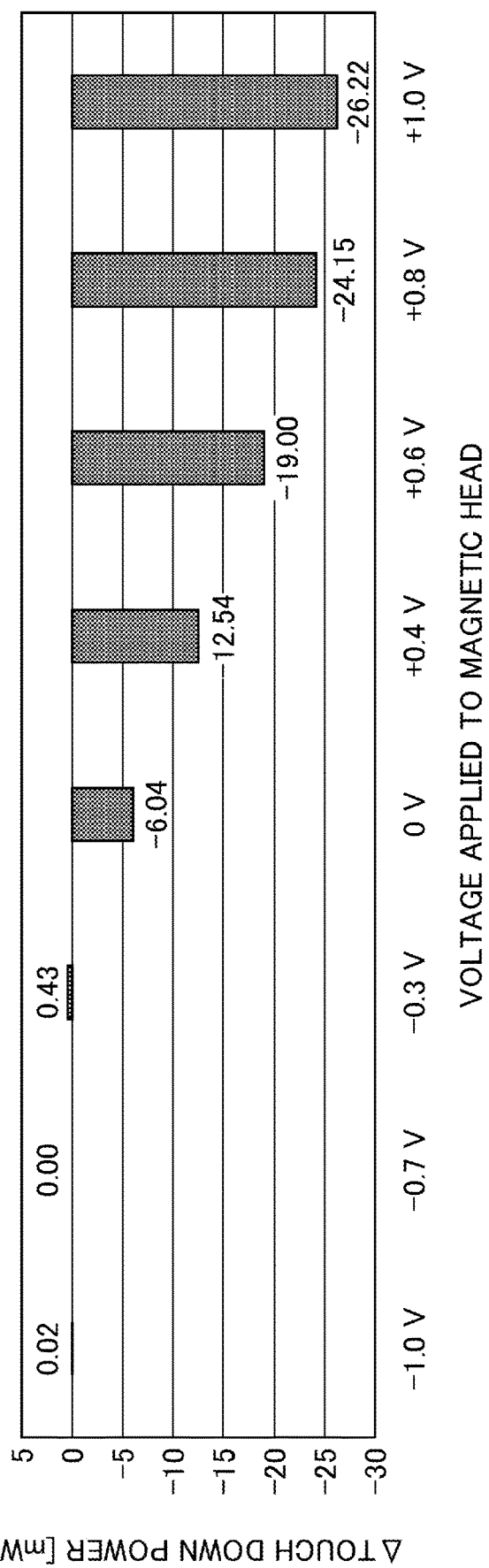
FIG. 3 is a diagram illustrating a relationship between a potential difference between the magnetic head and the magnetic recording medium, and a $\Delta$ touchdown power.

FIG. 3 illustrates a relationship of the potential difference between the magnetic head and the magnetic recording medium, and the Δ touchdown power. In FIG. 3, the ordinate indicates the Δ touchdown power [mW], and the abscissa indicates the applied voltage [V] to the magnetic head, that is, the potential difference [V] between the high-potential side in absolute value of the magnetic head element and the magnetic recording medium. Examples in which the potential difference between the high-potential side in absolute value of the magnetic head element and the magnetic recording medium is varied to +1.0 V, +0.8 V, +0.6 V, +0.4 V, and 0 V, respectively correspond to the comparative examples. On the other hand, examples in which the potential difference between the high-potential side in absolute value of the magnetic head element and the magnetic recording medium is varied to −0.3 V, −0.7 V, and −1.0 V, respectively correspond to the exemplary implementations.

As illustrated in FIG. 3, when the potential difference between the high-potential side in absolute value of the magnetic head element and the magnetic recording medium is −0.7 V or −1.0 V, the Δ touchdown power was essentially zero. From the relationship illustrated in FIG. 3, it may be regarded that adhesion of the contaminants to the magnetic head can be reduced by supplying a voltage in a range of −0.2 V to −1.0 V, and more preferably in a range of −0.3 V to −0.7 V, to the magnetic head element, with respect to the potential of the magnetic recording medium.

Although the embodiments and exemplary implementations are described as above, the embodiments and exemplary implementations are presented as examples, and the present disclosure is not limited to the embodiments and exemplary implementations. The embodiments may be implemented in various other forms, and various combinations, omissions, substitutions, modifications, variations, or the like may be made without departing from the spirit and scope of the present disclosure.

According to the embodiments described above, it is possible to provide a magnetic storage apparatus capable of reducing transfer of contaminants to a magnetic head.

Further, the present invention is not limited to these embodiments and exemplary implementations, but various combinations, omissions, substitutions, modifications, and variations may be made without departing from the scope of the present disclosure.

What is claimed is:

1. A magnetic storage apparatus comprising:
a disk-shaped magnetic recording medium;
a motor configured to drive and rotate the magnetic recording medium;
a magnetic head including
a first magnetic head element configured to read information from the magnetic recording medium,
a second magnetic head element configured to write information to the magnetic recording medium, and
a pair of electrodes sandwiching the first magnetic head element; and
a bias circuit configured to supply a predetermined bias voltage to the first magnetic head element,
wherein the magnetic recording medium has a laminated structure including a magnetic layer disposed above a substrate, and a carbon protective layer disposed above the magnetic layer, and
wherein the bias circuit supplies to the first magnetic head element a voltage which is in a range of −0.2 V to −1.0 V with respect to a potential of the magnetic recording medium.

2. The magnetic storage apparatus as claimed in claim 1, wherein the bias circuit supplies to the first magnetic head element a voltage which is in a range of −0.3 V to −0.7 V with respect to the potential of the magnetic recording medium.

3. The magnetic storage apparatus as claimed in claim 1, further comprising:
a preamplifier configured to receive, via the pair of electrodes, the information read from the magnetic recording medium by the first magnetic head element; and
an interconnect electrically connecting one of the pair of electrodes to the preamplifier and the bias circuit,
wherein the bias circuit supplies the predetermined voltage across the pair of electrodes.

* * * * *